(12) United States Patent
Ranganath et al.

(10) Patent No.: US 11,025,774 B1
(45) Date of Patent: *Jun. 1, 2021

(54) HOLD TIME REDUCER

(71) Applicant: GetHuman, Inc., Boston, MA (US)

(72) Inventors: Nischit Ranganath, Quincy, MA (US); Christian Allen, Belmont, MA (US); Jeff Whelpley, Melrose, MA (US)

(73) Assignee: GetHuman, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/391,655

(22) Filed: Apr. 23, 2019

Related U.S. Application Data

(63) Continuation of application No. 15/876,763, filed on Jan. 22, 2018, now Pat. No. 10,313,517.

(60) Provisional application No. 62/522,994, filed on Jun. 21, 2017.

(51) Int. Cl.
*H04M 11/00* (2006.01)
*H04M 3/493* (2006.01)
*H04M 3/428* (2006.01)

(52) U.S. Cl.
CPC ......... *H04M 3/493* (2013.01); *H04M 3/4286* (2013.01); *H04M 2203/2016* (2013.01); *H04M 2242/18* (2013.01)

(58) Field of Classification Search
CPC .. H04M 3/523; H04M 3/5231; H04M 3/5232; H04M 3/5238; H04M 3/428
USPC ............... 379/88.18, 265.01–266.1; 370/259
See application file for complete search history.

(56) References Cited

U.S. PATENT DOCUMENTS

| | | | |
|---|---|---|---|
| 9,560,210 B1 * | 1/2017 | Noble, Jr. ............. | H04M 15/60 |
| 2013/0336472 A1 * | 12/2013 | Fahlgren ............... | H04M 3/523 |
| | | | 379/266.01 |
| 2018/0338038 A1 * | 11/2018 | Ly ..................... | H04M 3/42008 |

\* cited by examiner

*Primary Examiner* — Md S Elahee
(74) *Attorney, Agent, or Firm* — Clocktower Law; Erik J. Heels; Michael A. Bartley

(57) ABSTRACT

The system allows a consumer to shortcut through a call queue to reach a human agent faster. For phone or voice-based calls that require a consumer wait on hold, the system can give that consumer an accurate estimate of the wait time and allow them to skip all or some of it. It does this by using automated processes to proactively dial and wait in those call queues, measuring their time in queue. A new consumer making an incoming call can then join the call queue occupied by of those automated processes, shortcutting the consumer past all or some of the wait time.

5 Claims, 3 Drawing Sheets

HOLD TIME REDUCER

CROSS-REFERENCE TO RELATED APPLICATIONS

This utility patent application is a continuation of and claims priority from U.S. patent application Ser. No. 15/876,763, filed 2018 Jan. 22, titled "HOLD TIME REDUCER" in the name of Nischit Ranganath, Christian Allen, and Jeff Whelpley, which claims priority from U.S. provisional patent application Ser. No. 62/522,994, filed 2017 Jun. 21, titled "HOLD TIME REDUCER" in the name of Nischit Ranganath, Christian Allen, and Jeff Whelpley.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright 2019 GetHuman, Inc.

BACKGROUND

Field of Technology

This relates to automatic dialing, via phone or other communication mechanism, for entities that utilize a phone system for incoming callers.

Background

Companies and institutions of all sizes today use phone systems with a combination of server-side phone and voice technology to queue and route incoming phone traffic. Collectively, these server-side technologies are designed to save money for the companies and institutions that use them.

From the client-side, namely the perspective of the user or consumer trying to call a particular company, for example for customer support, these server-side technologies, including interactive voice response (IVR) systems (en.wikipedia.org/wiki/Interactive_voice_response), are a source of frustration and delay.

In 2005, to address this frustration, Boston entrepreneur Paul M. English (en.wikipedia.org/wiki/Paul_M._English) published the "IVR Cheat Sheet" on his personal website (paulenglish.com/ivr/), which included "tips to bypass phone systems to quickly find a human" (paulenglish.com/phones/). Categories of companies on the IVR cheat sheet included finance, government, insurance, pharmacy, products, retail, shipping, technology, telco, travel, and TV/satellite. On 2006 Feb. 2, the IVR Cheat Sheet was replaced with a new dedicated website and service named GetHuman (www.gethuman.com). Since 2006, GetHuman has helped customers solve customer service problems.

GetHuman's Hold Time Reducer (HTR) system described herein programmatically initiates calls to phone systems and other voice-based communications systems that use queuing mechanisms, and the HTR system manages and optimizes the process of waiting in queues. The primary user of the HTR system is a consumer who wants to get through an organization's IVR tree and phone queue in order to talk to a live agent. For example, a consumer who needs to have a customer service issue solved and would like to avoid waiting on hold for an unreasonably long period of time.

Description of Prior Art

There are two general categories of existing products that somewhat relate to the HTR system: IVR-related products and "call back" services.

IVR-related products are server-side products used by organizations to manage incoming phone calls from consumers. In contrast, the HTR system is a client-side product built for and used by consumers to get through an organization's phone system faster and talk to a live human agent at that organization.

"Call back" services such as LucyPhone.com will call an organization for you and then call you back once they have a human agent. However, the big difference is that, unlike the HTR system, "call back" services do not actually get you to a human agent faster. "Call back" services just potentially eliminate the need for consumers to wait on hold. The HTR system, in contrast, reduces the amount of time to reach a human agent. So, for example, if the current hold time at an organization is 60 minutes, then a service like LucyPhone.com would take at least 60 minutes to get you to a live human agent before it calls you back. Using the HTR system in that same scenario, on the other hand, could potentially get you to a live human agent within 2 minutes.

U.S. Patents

U.S. Pat. No. 9,578,175 (issued 2017 Feb. 21, name WILLIAMS ET AL., title "COMMUNICATION DEVICE FOR ESTABLISHING AUTOMATED CALL BACK USING QUEUES") discloses, in the Abstract, "A communication device is provided for enabling a user to establish an automated call back from a communication system, such as a call center, for example. A software device application enables the communication device to communicate with the call center through the exchange of data. The communication device includes a display screen for displaying controls for allowing the user to interact with the communication system. The controls allow the user to request a list of providers from which to select a provider or company to contact. The communication device further provides controls for allowing the user to select a queue to join from a list of queues associated with the selected provider. An embodiment may also communicate contextual data between a communication device and a communication system, including information associated with the user of the communication device and information used to assist, instruct, or solve a user's problem."

U.S. Patent Application Publications

United States Patent Application Publication US20160344870 (published 2016 Nov. 24, name RAHUL NAIR, title "INTERACTIVE VOICE RESPONSE VALET") discloses, in the Abstract, "Methods, systems, and computer program products for providing interactive voice response (IVR) valet services are disclosed. A computer-implemented method may include receiving data associated with an interactive voice response system, generating a graphical user interface that allows a user to visually select services offered by the interactive voice response system, displaying the graphical user interface for the interactive voice response system to the user, providing the user with self-service information from the interactive voice system via the graphical user interface, initiating a communication to operate the interactive voice response system on the user's behalf, operating the interactive voice response system on the user's behalf in view of a user selection received via the graphical user interface, waiting on the user's behalf when the communication involving with the interactive voice response system is on hold, and connecting the user to the communication when a live person is responsive to the communication."

United States Patent Application Publication US20170013128 (published 2017 Jan. 12, name SHAN K. SASIDHARAN ET AL., title "INTERACTIVE VOICE RESPONSE (IVR) SYSTEM INTERFACE") discloses, in the Abstract, "A mobile device, such as a smart phone, receives and presents interactive audio content from an interactive voice response (IVR) system. The mobile device provides an interface that enables a user to navigate through a menu presented in the interactive content. The interface further presents action elements that identify actions that can be requested through the menu, and selection of the one of the action elements may cause the IVR to perform an associated action. For example, the interface may identify representatives at a call center, and a selection of one of the action elements causes the IVR to establish a communication between the mobile device and the selected representative. The action elements may further identify status information associated with the call center, such as an expected wait time."

Non-Patent Literature Documents

Non-Patent Literature Document by ERIC KRAPF, "Fonolo's iPhone App: Taps for the Traditional IVR?" in No Jitter (www.nojitter.com/post/225401002/fonolos-iphone-app-taps-for-the-traditional-ivr), 2010 Dec. 12, discloses Fonolo, an "IVR navigation tool for the iPhone" that "avoid[s] the frustration of slowly, methodically navigating through voice IVR menus, and quickly use a visual representation to get to where you want to go more easily" and allows users to "essentially 'bookmark' a particular level of an enterprise's IVR menu—if you're always calling customer service or reservations or whatever, you can make that your one click call to the company—no need to navigate through an audio IVR you know by heart from calling it so many times."

Non-Patent Literature Document by ENGHOUSE INTERACTIVE, "Mobile IVR Navigator" on EnghouseInteractive.com (www.enghouseinteractive.com/wp-content/uploads/2015/11/Product-Sheet-Mobile-IVR-Navigator.pdf), 2015 Oct. 26, discloses: "Enghouse Interactive's Mobile IVR Navigator is an innovative new development framework that allows you to build your mobile application. Using a web-based connection to any Enghouse Interactive Communications Portal IVR call flow, it presents options to users via their smartphone, tablet, or other mobile device. With no telephony resources required, the mobile IVR platform operates parallel to voice platforms without reducing capacity and enabling customers to take advantage of multi-media interactions anywhere, anytime." The following benefits are disclosed: "(1) Increase customer satisfaction: Allow customers to visually access their preferred communication channel and view availability/wait times for each (2) Reduce call times: Assure customers only connect once an agent has been secured through virtual queueing. Use pre-interaction time to capture key information. (3) Increase the number of correctly-routed calls: Reduce the number of times callers "zero-out" to bypass voice menus by making IVR navigation more user friendly. (4) Reduce quantity of calls into your contact center: Provide a more intuitive, visual self-service option that entices customers to handle more inquiries through agent-less channels—in turn reducing the amount of inbound lines into your business as well. (5) Increase IVR platform capacity: Add visual navigation capabilities without reducing voice capacity of your current IVR."

None of the above provides a hold time reducer that (1) allows a person to take the place of a process (2) already waiting in a phone queue (3) for the purpose of reaching a human agent at that organization in less time than if that person tried to call on their own. What is needed, therefore, is a hold time reducer that overcomes the above-mentioned limitations and that includes the features enumerated above.

BRIEF SUMMARY

We are trying to solve the problem of a consumer spending too much time in a call queue waiting to reach the end of the queue—in most cases, reaching the end of the queue means talking to a human agent. The HTR system solves this issue by managing a group of automated computer processes that initiate calls via phone or other voice-based communications platform, find their way through IVR trees to a call queue, and then wait in that queue. A voice-based call from a consumer can take the place of a process that has been waiting in the phone queue, and in most cases the consumer associated with the joining call will be in queue for less time than if they had initiated their call without the HTR system.

Features and Advantages

There are three primary features of the HTR system.

First—Automatic Dialing and Phone Queue Navigation. The processes that are part of the HTR system will automatically call an organization and respond to any prompts from the organization's IVR (e.g. "press 1 for our billing department"). The advantage of this feature is that consumers who use the HTR system do not need to know which phone number they should call or how to navigate through an organization's IVR tree to get to a live human agent.

Second—Allowing a Person to Take the Place of a Process Already Waiting on Hold. A consumer who wants to talk to a human agent at an organization can take the place of a process that is already waiting on hold for that organization. The advantage of this feature is that the consumers will wait less time to reach the human agent than if they called the organization on their own.

Third—Automatic Dial-and-Queue Process Management. A process manager monitors the health and status of all dial-and-queue processes. The advantage of this feature is that it ensures the scalability and robustness of the HTR system as a whole. For scalability, the process manager automatically scales up or scales down dial-and-queue processes for a given organization based on the number of consumers using the HTR system seeking to reach that organization. For robustness, the process manager detects call failures and automatically reconnects consumers using the HTR system with the organization they were calling.

BRIEF DESCRIPTION OF THE DRAWINGS

In the drawings, closely related figures and items have the same number but different alphabetic suffixes. Processes, states, statuses, and databases are named for their respective functions.

DETAILED DESCRIPTION, INCLUDING THE PREFERRED EMBODIMENT

In the following detailed description, reference is made to the accompanying drawings which form a part hereof, and in which are shown, by way of illustration, specific embodiments which may be practiced. It is to be understood that other embodiments may be used, and structural changes may be made without departing from the scope of the present disclosure.

Terminology

The terminology and definitions of the prior art are not necessarily consistent with the terminology and definitions of the current disclosure. Where there is a conflict, the following definitions apply.

Agent (or organization agent)—A human at an organization who answers phone calls and addresses the needs of consumers.

Client application—Any user interface application that be used to communicate with the process manager. For example, a mobile app, a desktop app, a web-based app.

Consumer—A person wanting to talk to a live human agent at an organization.

Dial-and-queue process—An automated process that calls a phone system, navigates an organization's IVR phone tree (IVR tree), then waits on hold in a queue, and takes other appropriate actions (such as "press 1 to continue holding") with the IVR and/or the agent.

Hold time reducer (HTR)—See SYSTEM.

Interactive Voice Response (IVR)—A term used to describe the technology used to implement menu options in a voice-based communications system (such as a phone system) to help route calls. For example, if you call a phone system and are greeted by a message saying "Press 1 for Department X, or Say 'Billing' for the Billing Department, or stay on the line to talk to a person," then you are listening to an IVR system.

Organization—A company or another entity which has a phone system with some sort of queueing mechanism for inbound calls.

Phone system—A combination of technology and people that typically includes (1) an IVR to answer incoming calls and route them to appropriate departments within the organization and (2) a queuing system for callers to wait in line to talk to a live human agent.

Process manager—An automated system that monitors all dial-and-queue processes and ensures scalability, reliability, and robustness.

Queuer—A person (such as a consumer) or an automated process (such as a dial-and-queue process) that is waiting in a call queue and/or intends to wait in a call queue.

System—The hold time reducer (HTR) product and service including all aspects of the product and service.

Operation

Figure 1:
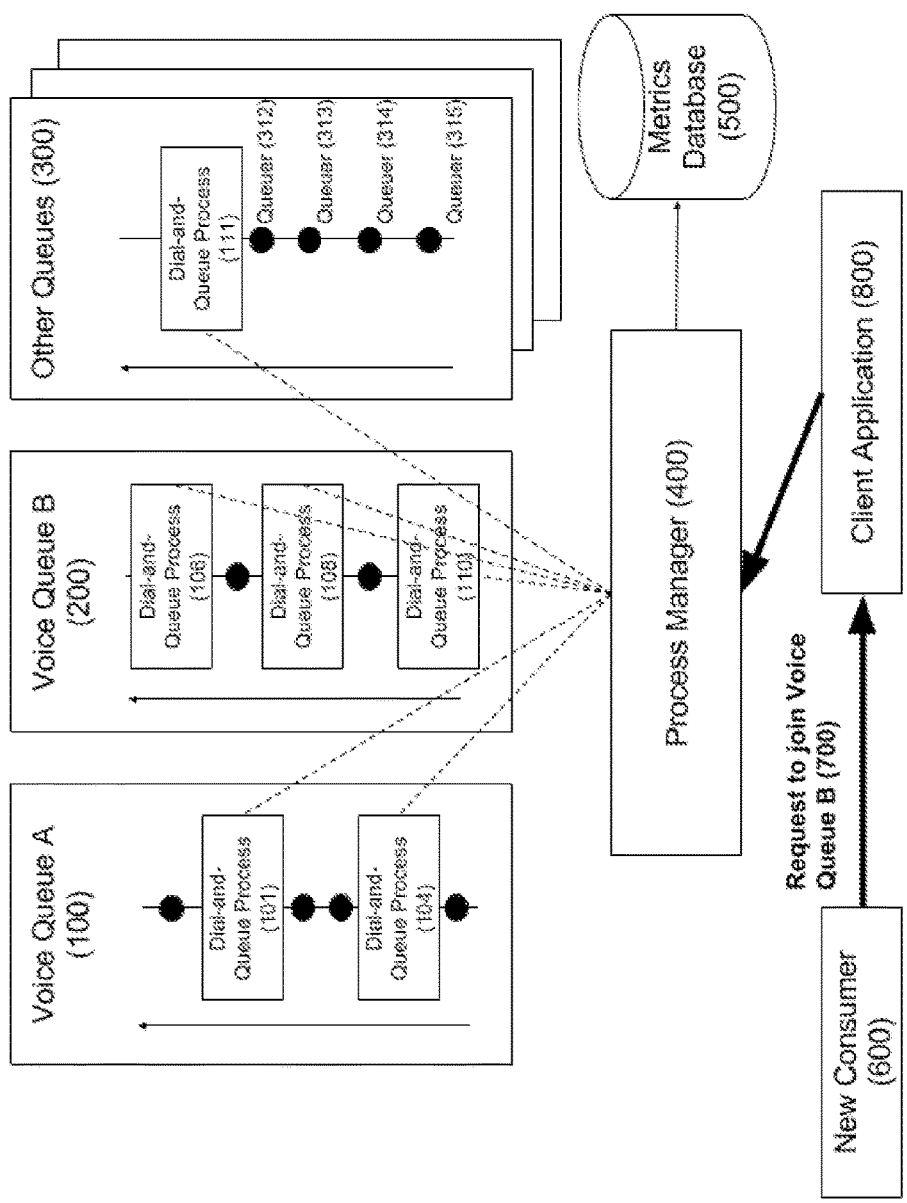
FIG. 1 is a high-level system diagram of the HTR system and also shows a "before" view of new consumer waiting to join a queue by using the HTR system.

Referring now to FIG. 1. Starting new dial-and-queue processes. Process manager 400 uses historical metrics stored in metrics database 500 for hold times and current user demand to determine the number and frequency of dial-and-queue processes (only dial-and-queue processes 101-111 are shown in FIG. 1 to illustrate how this works) to create and run for each target organization's phone queue. Voice queue A 100 represents the voice queue for organization A, voice queue B 200 represents the voice queue for organization B, and so on. Based on the metrics stored in metrics database 500, process manager 400 creates and runs one or more dial-and-queue processes (101-111 shown) at configurable intervals. Dial-and-queue processes created by process manager 400 maintain communication with and report their status and health to process manager 400 until they are terminated by process manager 400. Process manager 400 may also launch dial-and-queue processes as needed to ensure there are more dial-and-queue processes for a given queue than consumers using the system to reach the organization having that particular queue. By ensuring there are more processes and consumers, should any dial-and-queue process terminate without connecting a consumer to human agent, there are still sufficient dial-and-queue processes pending to serve all consumers.

Navigating phone queue. Each dial-and-queue process (101-111 shown) uses information supplied by process manager 400 to call a target organization and navigate the organization's IVR tree to reach the end of the IVR tree and the beginning of the call queue. Each dial-and-queue process is maintaining an active phone call with the target organization and may have to periodically interact with the IVR and/or an agent to stay in the queue.

Continuing now with FIG. 1. Swapping a consumer for a dial-and-queue process. A new consumer 600, having the intent to reach a human agent at a given organization, uses client application 800 to send request to join voice queue B 700 to process manager 400. Process manager 400 receives and process request to join voice queue B 700, finds an available dial-and-queue process (dial-and-queue process 106 in this example) already in the appropriate queue (voice queue B 200 in this example), and then connects new consumer 600 to dial-and-queue process 106, which is an active call already in process. Progress manager 400 does this via a VoIP call made to client application 800, via a call made to the phone of new consumer 600, or via some other communication means.

Figure 2:
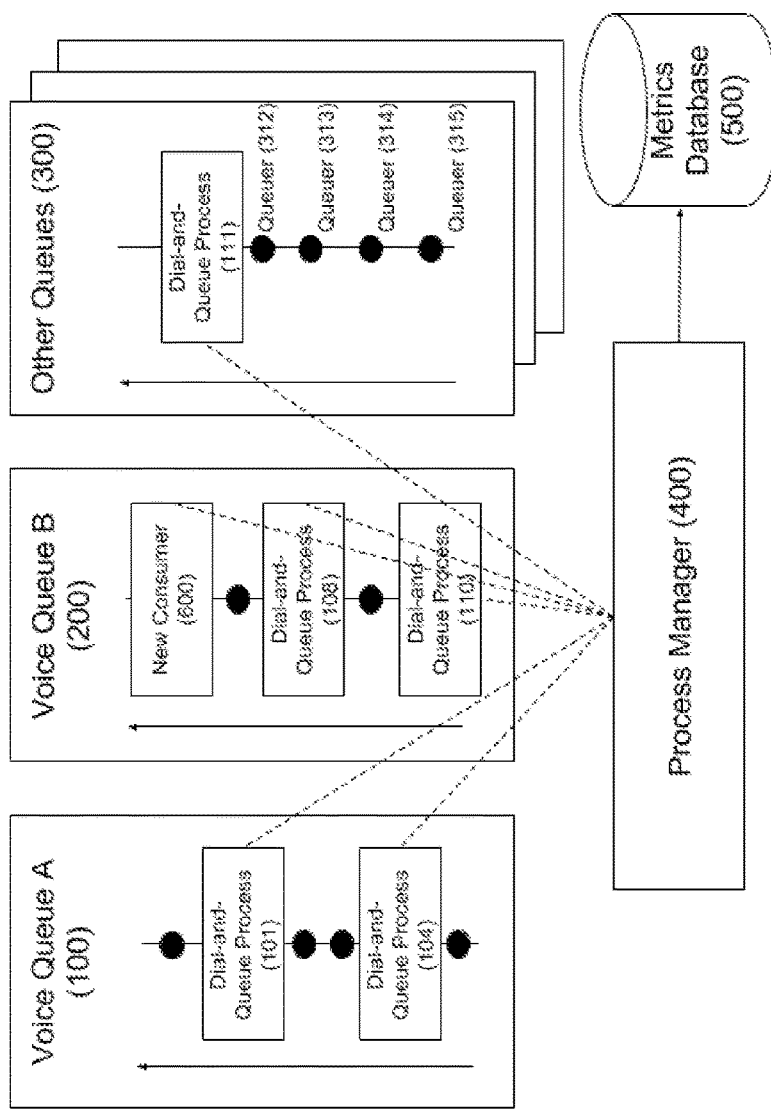
FIG. 2 is shows the "after" view of a new consumer having taken the place of a dial-and-queue process in a queue.

Referring now to FIG. 2. New consumer 600 has taken the place of dial-and-queue process 106 in voice queue B 200.

Terminating a dial-and-queue process. If a dial-and-queue process reaches the end of a call queue and no other queuers are requesting to join that queue, then the process manager terminates that dial-and-queue process.

Other Embodiments

In another embodiment, the HTR system works for international calls.

In another embodiment, the HTR system accurately predicts wait times and can guarantee a maximum wait time to an incoming queuer, such as "2 minutes".

In another embodiment, the HTR system works on any voice-based communication queue.

In another embodiment, the HTR system works on any digital communication queue, such as chat and video chat.

In another embodiment, the HTR system uses voice recognition technology to understand that it has reached the end of a call queue.

In another embodiment, the HTR system uses human behavior recognition technology to understand that it has reached the end of a call queue.

In another embodiment, the HTR system uses a call-back option when it has reached the end of a call queue.

In another embodiment, the HTR system begins a conversation with the organization agent reached after the call queue using information supplied to it before reaching the end of the queue.

In another embodiment, a dial-and-queue process has a full conversation with the organization agent reached after the call queue using information supplied to the dial-and-queue process before reaching the end of the queue.

In another embodiment, the HTR system is customized with personal information from the consumer. For example, the process manager collects the name and address of the consumer and then pass that info to the dial-and-queue process so that it can be used when a given organization's IVR asks "Please enter your name" and "Please enter your address."

In another embodiment of the HTR system, process manager 400 calculates and stores monetary values (not shown) associated with each dial-and-queue process, stores those values in metrics database 500, communicates those values to client application 800, and allows new consumers to buy specified dial-and-queue processes either directly or by auction with other new consumers. In this way, a new consumer can bid or buy their way to the frontmost location of a given queue.

In another embodiment, the HTR system automatically adjusts navigation paths based on call failure (i.e. a certain path is no longer valid) and/or detection of a more optimal route. A given company's IVR tree can have multiple endpoints, which allows the system to "race" different paths against one other. In other words, there may be 3 processes waiting in line for the "accounting" department, 2 other processes waiting in line for the "rebates" department, and another 5 processes in the queue for the "everything else" group. There could be a situation where we start off consumers in the "everything else" queue but then figure out that based on their specific problem and/or changes in the other queues, it would be more efficient to switch that consumer from the "everything else" queue to the "rebates" queue on the fly. The consumer will not know the difference, but the net result is that the consumer would reach a live agent faster than if we kept them in their original queue.

In another embodiment, the HTR system adds one or more custom dial-and-queue processes for a specific user with their personal information.

In another embodiment, the HTR system has the ability to switch a consumer from one dial-and-queue process to another for optimization purposes (i.e. the consumer has already has taken the place of one process, but then we switch them to a different process that the system thinks will work better).

In another embodiment, client application is selected from the group consisting of desktop application, tablet application, mobile phone application, and website application.

In another embodiment, the HTR system solves the "N+1" problem, described further below. When dial-and-queue processes are first launched for a specific organization, launching at least two such processes is beneficial. It can be important to create more than one dial-and-queue process for a given queue, as any given dial-and-queue process reaching a human agent may be disconnected, or hung up on, by the agent. By launching multiple dial-and-queue processes, there is still at least one process pending through the queue (and likely near the end of the queue) when the first was answered. If a consumer requests to take the place of the dial-and-queue processes after the dial-and-queue process that had been first in line gets hung up on, then the new consumer can take the place of another dial-and-queue process that the process manager 400 previously created. They key to solving the problem of dial-and-queue processes getting hung up on by agents is to create more dial-and-queue processes than active consumers. If "N" represents the number of new consumers connecting to an organization's voice queue, then the ideal number of dial-and-queue processes for process manager 400 will be at least N+1 and may be N+2, N+3, or a greater number.

When a dial-and-queue process for a given organization reaches an agent without a request from a new consumer to take the place of the dial-and-queue process, then that dial-and-queue process terminates (either by the agent hanging up on the dial-and-queue process or the process manager 400 terminating the dial-and-queue process), but now the HTR system has data about the hold time for that organization's voice queue. With the information about a given organization's hold time, the process manager 400 can accurately terminate dial-and-queue processes that have not been replaced by a new consumer before the dial-and-queue processes reach an agent. For example, the HTR system can terminate a dial-and-queue process one minute before it is scheduled to reach an agent based on the given organization's hold time data, and as hold times increase or decrease, the process manager 400 accelerates or decelerates terminating dial-and-queue processes accordingly.

Figure 3:
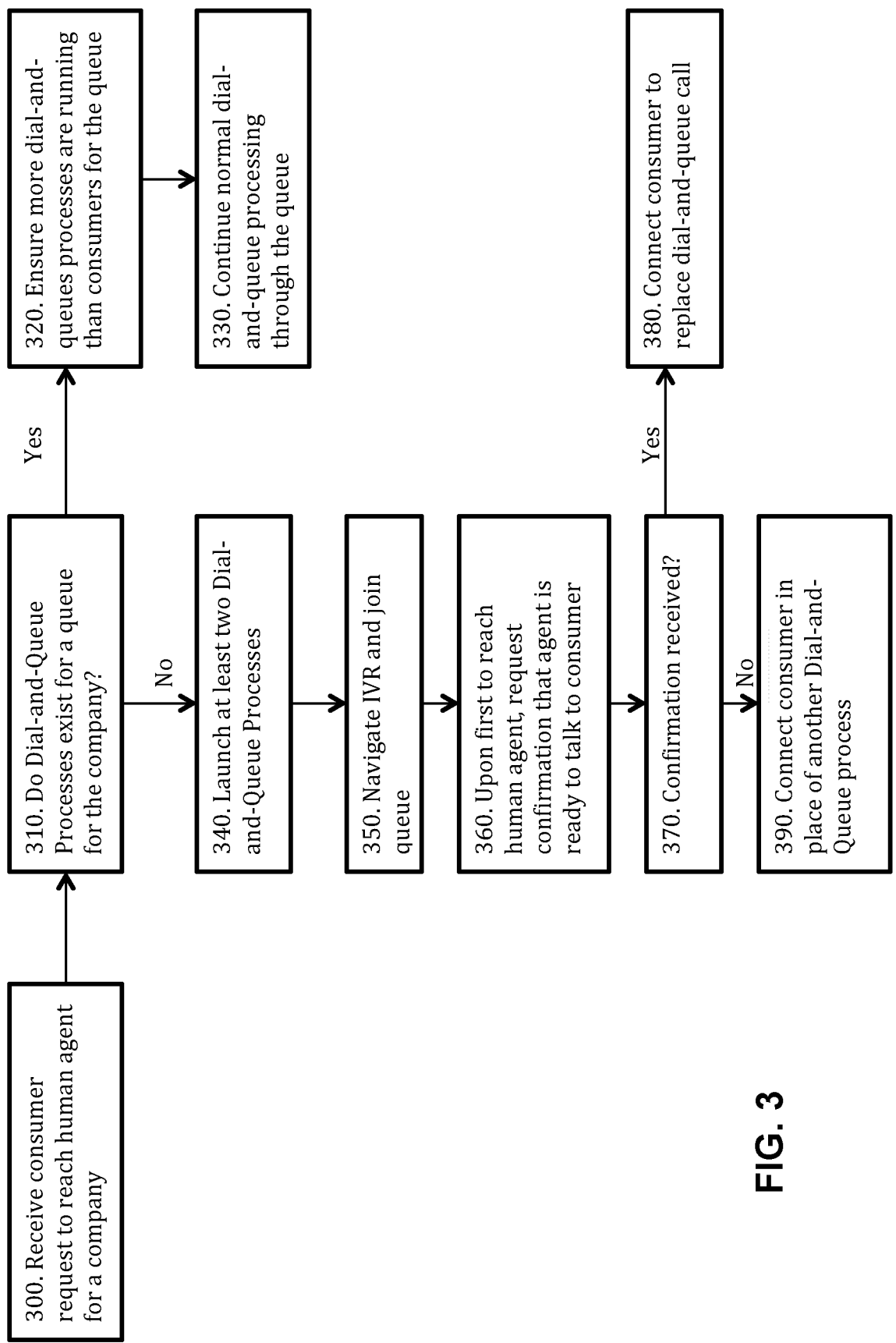
FIG. 3 is a flowchart illustrating handling a new consumer requesting to reach a queue which lacks a current dial-and-queue process.

The "N+1" problem and solution also applies when a new consumer calls attempting to reach a company for which no active dial-and-queue processes exist. This may be due to periodic spikes or lulls in caller volume clearing a queue, or other reasons. There are certain organizations that the HTR system cannot call all of the time, because those organizations will periodically terminate all calls waiting in line in each organization's call queue. This may be based on time (periodic queue reset) or volume (clearing all calls from an overloaded system), and may also occur for other reasons such as through a power outage or if the organization's IVR system reboots. Referring also to FIG. 3, process manager 400 receives 300 a request from a consumer to reach a human agent for a company. Process manager 400 checks 310 if there are existing and active dial-and-queue processes for a call queue for the company. If so, process manager 400 may initiate more dial-and-queue processes as needed to ensure 320 there are more dial-and-queue-processes than consumers for a particular queue, and continue 330 processing through the IVR tree and queue as detailed above. If there are no active dial-and-queue processes for a call queue for the company, then process manager 400 may create and run 340 two or more dial-and-queue processes to navigate 350 an IVR and process through a queue for the company. When the first dial-and-queue processes reaches an agent, it may request 360 confirmation that the agent is ready to talk to the consumer. Such request may be by playing or generating a message requesting confirmation. Confirmation may be received 370 by audio (such as voice recognition) or button press (such as detecting button tones or other key press from the agent). If confirmation is received, process manager 400 may connect 380 the consumer in place of the connected dial-and-queue process. If confirmation is not received, or disconnection is detected (likely due to the agent disconnecting from the call), process manager 400 may connect 390 the consumer to take the place of another dial-and-queue process. By launching two or more at the same time, the consumer is able to take the place of a process which should be, based on termination of the one of the processes, near the end of the queue. While this solution does not get the consumer to reach a human agent faster than the wait time of the queue, it avoids the consumer having to wait on hold throughout.

As will also be apparent to those skilled in the art, the Hold Time Reducer encompasses alternate embodiments of the software program in which the functions of the system are performed by modules different than those shown in the figures. The Hold Time Reducer may process the data in a serial or parallel fashion, or a combination of the two, without departing from the spirit or scope of the invention. Software programs used in the HTR system may be written in one of several widely available programming languages, and the modules may be coded as subroutines, subsystems, or objects depending on the language chosen. Similarly, data used by Hold Time Reducer is described and represented as logical records embodied in a database, but the invention is not limited to the described arrangement of data records, nor is the use of any particular type of data management system implied. Database systems from vendors such as Oracle, Sybase, Informix, or Microsoft provide the necessary infrastructure for managing the underlying data in the system, whether it is centralized or distributed, but other organizational data structures, e.g. indexed flat files or XML-based data structures, may be substituted without exceeding the scope of the invention. Telephony systems from vendors such as FreeSWITCH may provide the infrastructure for interacting with Voice-over-IP and PSTN voice communication systems, but other voice-communication-management systems may be substituted without exceeding the scope of the invention.

The various queues and processes may be implemented on one single physical server, multiple servers, virtual servers, distributed servers, or any combination thereof. The Hold Time Reducer may also be implemented as a program running on a server, or any hardware or software device operative to communicate with a server.

Furthermore, alternate embodiments that implement the Hold Time Reducer in hardware, firmware, or a combination of both hardware and software, as well as distributing the modules and/or the data in a different fashion will be apparent to those skilled in the art and are also within the scope of the invention.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method of connecting consumers with human agents through telephone call queues comprising:
   providing a process manager that, prior to or in response to a first request to reach a human agent through a call queue of an organization uses metrics to determine a number and frequency of dial-and-queue processes to, create and run two or more dial-and-queue processes for the call queue of the organization;
   calling, by each of the dial-and-queue processes, the call queue and navigating a phone system of the organization to reach an end of an IVR tree of the organization;
   reaching, by one of the dial-and-queue processes, an answering human agent through an end of the call queue;
   tracking and updating, by the process manager, wait time metrics for the call queue based on a hold time of the one of the dial-and-queue processes;
   if a consumer has requested, through a client application, to reach a human agent through the call queue:
      requesting confirmation that the answering human agent is ready to talk to the consumer;
      detecting a voice confirmation, a button press confirmation, or a call disconnection;
      if the voice confirmation or the button press confirmation is detected, connecting the consumer in place of the one of the dial-and-queue processes; and
      if the call disconnection is detected, connecting the consumer in place of another of the dial-and-queue processes, wherein the connecting occurs based on the tracked wait time metrics such that the consumer takes the place of the another of the dial-and-queue processes before the another of the dial-and-queue processes reaches the end of the call queue; and
   if no consumer has requested to reach a human agent through the call queue, terminating the one of the dial-and-queue processes.

2. The method of claim 1, further comprising launching additional dial-and-queue processes to replace terminated dial-and-queue processes to ensure that at least two dial-and-queue processes are actively waiting to reach the end of the call queue.

3. A method of connecting consumers with human agents through telephone call queues comprising:
   receiving, by a process manager, a request from a client application of a consumer to reach a human agent at an end of a call queue of an organization;
   identifying, by the process manager, if any dial-and-queue processes exist for the call queue wherein the process manager uses metrics to determine a number and frequency of dial-and-queue process to create and run the processes;
   when no existing dial-and-queue processes for the queue are identified:
      launching, by the process manager, at least at least two dial-and-queue processes for the call queue; and
      calling, by each of the at least two dial-and-queue processes, a phone system of the organization and navigating the phone system to reach the call queue at an end of an IVR tree of the organization;
   when existing dial-and-queue processes for the call queue are identified:
      launching, by the process manager, as many additional dial-and-queue processes as needed to ensure there is at least one more dial-and-queue process than a number of consumers actively requesting the process manager to reach human agents through the call queue; and
      calling, by each additional dial-and-queue process, the phone system of the organization and navigating the phone system to reach the call queue at the end of the IVR tree of the organization;
   recognizing when a call by one of the dial-and-queue processes is answered by a human agent;
   playing a message to the human agent requesting confirmation that the human agent is ready to talk to the consumer;
   detecting a voice confirmation, button press confirmation, or call disconnection;
   when voice confirmation or button press confirmation is detected, connecting the consumer in place of the dial-and-queue process call; and when disconnection is detected, connecting the consumer to take a place in the queue of another of the dial-and-queue processes.

4. The method of claim 3, further comprising:
tracking, by the process manager, wait time metrics for the call queue and updating the tracked wait time metrics based on a hold time when the one of the dial-and-queue processes is answered by a human agent; and
wherein connecting when disconnection is detected is timed based on tracked wait time metrics such that the consumer takes the place before the another of the dial-and-queue processes reaches the end of the call queue.

5. A system for connecting consumers with human agents through telephone call queues comprising:
a process manager that, prior to or in response to a first request to reach a human agent through one or more call queues, uses metrics to determine a number and frequency of dial-and-queue processes to create and run two or more dial-and-queue processes for each of the one or more call queues, each call queue associated with one of one or more organizations;
wherein each of the dial-and-queue processes calls a phone system of the associated organization and navigates an IVR tree of the phone system to reach the call queue;
wherein when any of the dial-and-queue processes reach a human agent at an end of the call queue, the process manager updates hold time metrics for that call queue; and
a client application, used by a consumer, that sends a request to the process manager to reach one of the call queues;
wherein the process manager receives the request, finds an available dial-and-queue process, and based on the hold time metrics makes a connection of the consumer to the available dial-and-queue process before the available dial-and-queue process reaches the end of the call queue;
whereby the consumer takes a place of the available dial-and-queue process in the call queue.

\* \* \* \* \*